Figure 1:
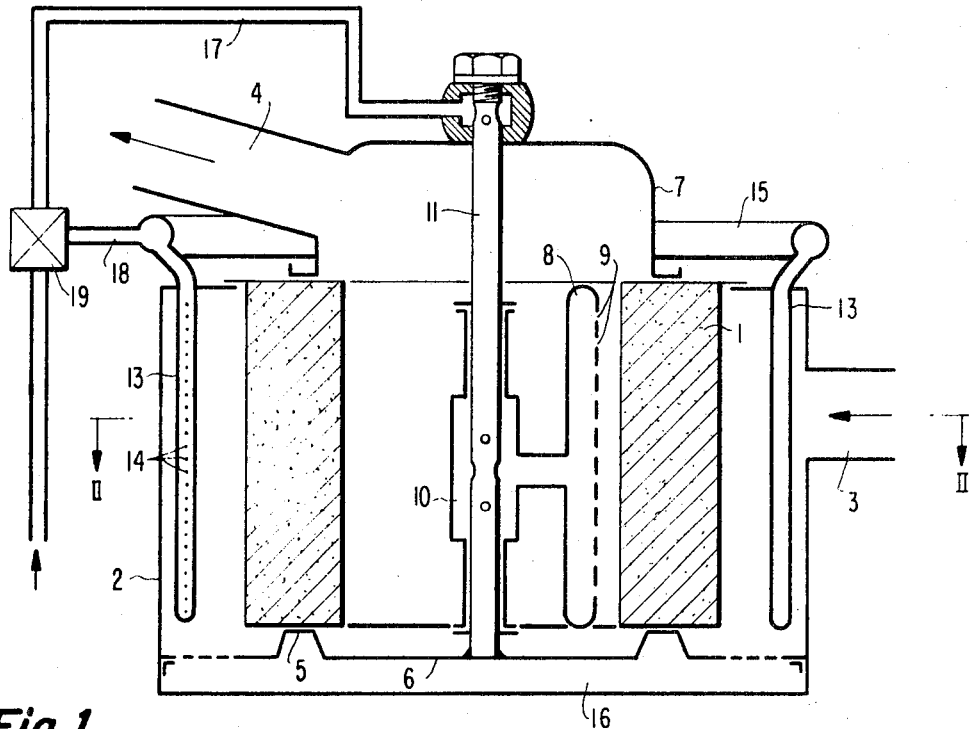

United States Patent [19]

Mischke

[11] 3,716,968
[45] Feb. 20, 1973

[54] INSTALLATION FOR FILTERING AND CLEANING FILTERS

[75] Inventor: Arthur Mischke, Ruit Kreis Esslingen, Germany

[73] Assignee: Daimler-Benz Aktiengesellschaft, Stuttgart-Unterturkeim, Germany

[22] Filed: March 26, 1970

[21] Appl. No.: 22,840

[30] Foreign Application Priority Data

March 28, 1969 Germany..................P 19 16 099.7

[52] U.S. Cl..................................55/294, 55/302
[51] Int. Cl. .......................................B01d 46/04
[58] Field of Search........55/272, 283, 302, 303, 293, 55/294, 291

[56] References Cited

UNITED STATES PATENTS

| | | | |
|---|---|---|---|
| 2,591,198 | 4/1952 | Ringe | 55/294 |
| 2,796,146 | 6/1957 | Hersey, Jr. et al | 55/294 |
| 3,004,276 | 10/1961 | Hoffman | 55/293 |
| 3,095,289 | 6/1963 | Egan | 55/96 |
| 3,325,978 | 6/1967 | Rymer et al. | 55/302 |
| 3,360,907 | 1/1968 | Clark, Jr. et al | 55/302 |
| 3,541,631 | 11/1970 | Kluge et al. | 55/273 |
| 3,325,978 | 6/1967 | Rymer et al. | 55/294 |

FOREIGN PATENTS OR APPLICATIONS 909,345 10/1962 Great Britain..........................55/294

*Primary Examiner*—Bernard Nozick
*Attorney*—Craig & Antonelli

[57] ABSTRACT

An installation for cleaning a filter, particularly a paper filter or the like, arranged in the intake installation of a combustion engine, in which a blow-out device adapted to be connected with a compressed air source is arranged inside of the intake installation which has one or several discharge apertures that are directed preferably approximately perpendicularly against the filtered-air-side of the filter; additional blow-out devices may be provided on the outside of the filter whose discharge apertures are directed approximately tangentially to the outer side of the filter so as to remove from the filter those dust particles which have been loosened by the blast from the discharge apertures on the inside of the filter.

14 Claims, 2 Drawing Figures

PATENTED FEB 20 1973 3,716,968

INVENTOR
ARTHUR MISCHKE

BY Craig, Antonelli,
Stewart & Hill
ATTORNEYS

INSTALLATION FOR FILTERING AND CLEANING FILTERS

The present invention relates to an installation for cleaning a paper filter or the like arranged in the suction system of a combustion engine.

Since the degree of soiling of the sucked-in combustion air is of decisive significance for the length of life of an engine, particular attention must be paid, in addition to the tightness of the suction system, to the filtering of the sucked-in air. Customarily, vehicles are equipped with oil--bath filters which achieve a relatively good filtering efficiency depending on the type of construction and with a correct matching to the engine. However, these types of filters cannot filter out fine dust particles so that in dusty areas this may lead to a dustry condition of the pure-or filtered-air-side and therewith to premature engine failure or breakdown due to wear.

In order to properly take into consideration these operating conditions, a filtering by means of paper filters has become known in the prior art. These paper filters may be utilized in combination with the oil-bath-air-filter, eventually also with an additional cyclone separator so that an excellent air filtering and therewith very long service lives were achieved. It is also possible without difficulties to provide a pure paper air filtering, possibly also in conjunction with a cyclone separator.

The use of the paper air-filtering, however, requires the possibility for cleaning the paper filter. These paper filters can be easily damaged in case of improper handling whereby the effectiveness is strongly reduced or possibly even completely nullified. Consequently, very expensive air suction installations are provided for the most part, in which additional filter installations are present. On the other hand, in case of inadequate servicing of the paper filter, the suction vacuum increases very rapidly which is connected with disadvantageous consequences for the engine. Added thereto is the danger that in export countries or the like, paper filters damaged during the cleaning operation are possibly not available as spare parts.

The present invention is concerned with the purpose to avoid these disadvantages and to create an installation of the aforementioned type which enables a rapid and effective cleaning without exposing the paper filter to the danger of becoming damaged.

The present invention essentially consists in that a blow-out or cleaning device adapted to be connected with a compressed-air source is provided on the inside of the suction system which is provided with one or several discharge or blow-out apertures that are directed preferably perpendicularly to the filtered-air side of the paper filter. One obtains by such an installation the particular advantage that no danger of damaging the paper filter exists because the paper filter does not need to be disassembled for the purpose of the cleaning operation. As a result thereof also the tightness and the seal of the entire suction air installation is not influenced. A considerable increase of the filter operating time results therefrom while avoiding premature engine wear in case of re-use of defective filter inserts. Additionally, the cleaning operation is not dependent on expert handling by servicing personnel.

A particular advantageous type of construction of the present invention is achieved if a rotating tube connected to the compressed-air source is arranged in a conventional filter housing, which is provided with fine bores serving as blow-out or discharge apertures. It is particularly appropriate in connection therewith if the tube or pipe extends at a small distance parallel to the inner surface of the paper filter and has a central connection for the compressed air.

In order to attain a rotary drive for the tube in a simple manner, the tube may be provided additionally with tangentially directed discharge apertures. The rotary drive then takes place as a result of the reaction of the tangentially discharged air jets.

In order to further increase the cleaning action and efficiency, further discharge nozzles may be arranged between the filter housing and the filter paper on the raw-air or unfiltered-air side of the filter. Advantageously the discharge or blow-out apertures of the outer blow-out or discharge nozzles may be directed against the unfiltered-air side of the paper filter under a flat angle. The dust particles loosened out of the pores of the paper filter are removed by these outer discharge nozzles. Appropriately, the outer discharge or blow-out nozzles constructed as tubular elements may be connected to a common annular channel.

In order to facilitate the cleaning, the filter housing may be provided with a separating space at its lowest place. The separating space may include advantageously a preferably automatically operating discharge installation.

In order to obtain according to a further feature of the present invention an automatic cleaning operation, a switching installation of conventional construction may be provided which connects the compressed-air source with the discharge or blow-out apertures either dependent on the vacuum downstream of the paper filter or at predetermined intervals of time. It may be additionally particularly advantageous for the cleaning effectiveness if the connection of the compressed-air source with the discharge apertures takes place intermittently.

Accordingly, it is an object of the present invention to provide an installation for cleaning paper filters which avoids by simple means the aforementioned shortcomings and drawbacks encountered in the prior art.

Another object of the present invention resides in an installation for cleaning paper filters for internal combustion engines which assure a long length of life of the paper filter while at the same time avoiding danger of premature wear of the engine due to the presence of dust particles in the combustion air.

Still another object of the present invention resides an installation for cleaning paper filters which avoids the danger of damage to the filter during the cleaning operation.

A still further object of the present invention resides in a cleaning installation for paper filters which eliminates the need for disassembly and removal of the paper filter for the purpose of cleaning the same.

Still another object of the present invention resides in an installation for cleaning paper filters which operates in a highly effective manner and which minimizes the need for handling by skilled service personnel.

Figure 2:
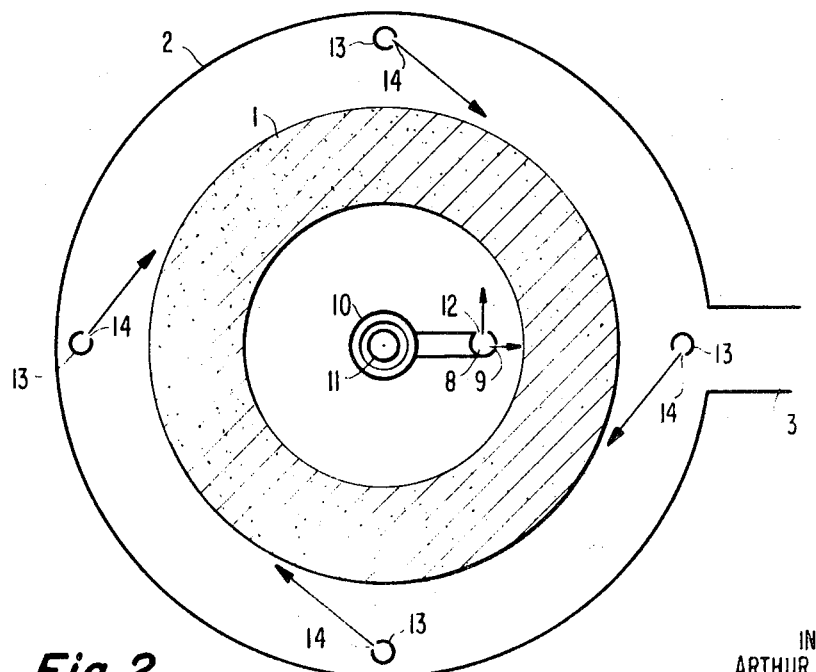

These and further objects, features and advantages of the present invention will become more obvious from the following description when taken in connection with the accompanying drawing which shows, for purposes of illustration only, one embodiment of a cleaning installation in accordance with the accompanying drawing which shows, for purposes of illustration only, one embodiment of a cleaning installation in accordance with the present invention, and wherein:

FIG. 1 is a somewhat schematic, longitudinal cross-sectional view through an installation for cleaning a paper filter in accordance with the present invention, and FIG. 2 is a somewhat schematic cross-sectional view taken along line II—II of FIG. 1.

Referring now to the drawing wherein like reference numerals are used throughout the two views to designate like parts, reference numeral 1 designates in both figures a paper filter arranged in the air intake system of a motor vehicle combustion engine (not shown). The cylindrically constructed filter housing 2 is provided along its outer cylindrical surface with a suction or inlet aperture 3 and is provided at its top with a further aperture 4 that leads to the vehicle engine. The cylindrically constructed paper filter 1 of any conventional construction is arranged on the inside of the well sealed filter housing 2 between the suction aperture 3 and the aperture 4 leading to the vehicle engine. The paper filter 1 is inserted in a tight manner between an annular bead 5 on the bottom 6 of the filter housing 2 and the cover 7 of the filter housing 2. The paper filter 1 may be used either by itself or in combination with the known oil-bath air filters and/or cyclone separators.

A blow-out installation is arranged on the inside of the paper filter 1 which is adapted to be connected with a compressed air source (not shown). The blow-out apparatus consists of a rotating pipe 8 which is provided with a number of fine bores 9 as blow-out or discharge apertures that are directed perpendicularly against the inner surface, i.e., the filtered-air side of the paper filter 1. The tubular member 8 is provided with a central bearing support 10 which is rotatably arranged on a further tubular member 11 that extends through the filter housing 2 from above. This central tubular member 11 serves simultaneously as connection for the compressed air source. In order to produce the rotary movement, the tubular member 8 is provided with additional, tangential bores 12 (FIG. 2) so that a rotary movement is achieved by the tangentially discharged air jets. The tubular member 8 is arranged at a small distance and parallel to the inner surface of the paper filter 1.

Further discharge or blow-out nozzles 13 are fixedly arranged between the filter housing 2 and the paper filter 1 on the unfiltered-air-side thereof. The discharge apertures 14 of these outer blow-out or discharge nozzles 13 are directed at a flat angle, approximately tangentially (FIG. 2) against the unfiltered-air-side of the paper filter 1. The four outer discharge nozzles 13 are connected to a common annular channel 15, by way of which they are adapted to be supplied with compressed air. A separating space 16 for the dust removed out of the paper filter 1 is provided below the filter housing bottom 6 disposed upright in the illustrated embodiment. In order to empty out the separating space 16, an ejection or discharge mechanism of any conventional construction and therefore not illustrated in detail is provided which operates preferably automatically in a conventional manner.

The cleaning of the paper filter 1 takes place by blasting or blowing against the filtered air side the fine compressed air jets from the rotating tubular member 8. A propulsion is thereby imparted to the tubular member 8 by the tangentially provided bores 12 in accordance with the reaction principle. The dust particles are thus blown out of the filter 1. Simultaneously the unfiltered-air-side of the paper filter 1 is tangentially blasted by the outer discharge nozzles 13 whereby the dust particles loosened out of the pores of the filter are removed from the paper filter 1 and drop into the separating space 16 arranged therebelow. It has been discovered in actual tests that a cleaning operation of approximately one minute is adequate. It has proved itself as particularly appropriate in connection therewith if the compressed air action against the filtered air side and the unfiltered air side is undertaken alternately during a few seconds, for example, fifteen seconds. In the installations customarily present in motor vehicles for producing an air pressure of 6–7 atmospheres, a minimum air consumption of about 1.5 to 3 liters is needed thereby per cleaning operation depending on filter size. A mechanical excitation of the filter housing 2 and therewith in the paper filters 1 to be cleaned takes place thereby as a result of the action with compressed air which favors the cleaning operation.

In order to render the cleaning operation independent of the handling and attention of the servicing personnel, a program control of conventional construction may be provided by relatively simple means which operates either semi-automatically or automatically. For example, for that purpose a switch 19 of conventional construction may be installed into the feed lines 17 and 18 for the compressed air for the inner tubular member 8 and the annular channel 15 of the outer discharge nozzles 13. The control can take place dependent on a filtering resistance, i.e., the vacuum downstream of the paper filter 1 which corresponds to a definite degree of soiling.

However, it may also be appropriate to undertake the engagement of the cleaning operation in predetermined intervals after a predetermined operating time or after a predetermined number of operating hours. Since such control systems are known as such in the prior art a detailed description therewith is dispensed with herein.

A very good cleaning can be obtained by the cleaning installation according to the present invention so that after each cleaning operation practically the same filter resistance is reached again. The remaining small residual dirt or soiling is without significance for a completely satisfactory operation of the paper filter 1.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A cleaning installation comprising a filter arranged in a filter housing within an air intake system of a combustion engine, said filter housing including means for directing unfiltered air through the filter from one side thereof and means for the exiting of filtered air at the other side thereof, blow-out means mounted within the filter housing and connected with a compressed air means, said blow-out means including a rotating tubular member having a discharge aperture means for directing air substantially perpendicularly to the filtered air side of the filter about the surface thereof, and discharge nozzle means provided between the filter housing and the filter for directing air toward the unfiltered air side of the filter about the surface thereof.

2. An installation according to claim 1 characterized in that said tubular member is provided with additional tangentially directed discharge aperture means which serve for rotating said tubular member when compressed air is discharged therefrom.

3. An installation according to claim 1, including a paper filter.

4. An installation according to claim 1, characterized in that the paper filter is cylindrically shaped.

5. An installation according to claim 1 characterized in that said discharge aperture means includes a plurality of small bores for directing jets of air substantially perpendicularly to the filtered air side of the filter.

6. An installation according to claim 5, characterized in that the tubular member extends at a slight distance substantially parallel to the inner surface of the filter and is provided with a central connecting means for the compressed air.

7. An installation according to claim 6, characterized in that the tubular member is provided with additional tangentially directed discharge aperture means.

8. An installation according to claim 7, characterized in that said discharge nozzle means are provided with discharge aperture means directed under a flat angle toward the unfiltered-air side of the filter.

9. An installation according to claim 8, characterized in that the discharge aperture means of said discharge nozzle means are directed substantially tangentially against the unfiltered-air side of the filter.

10. An installation according to claim 8, characterized in that said discharge nozzle means are constructed as tubular elements and are connected to a common annular channel.

11. An installation according to claim 10, characterized in that the filter housing is provided approximately at its lowest place with a separating space.

12. An installation according to claim 11, characterized in that the separating space includes a discharge means for discharging the accummulated dirt.

13. An installation according to claim 12, characterized in that the discharge means is automatically operating.

14. A cleaning installation comprising a filter arranged in a filter housing within an air intake system of a combustion engine, said filter housing including means for directing unfiltered air through the filter from one side thereof and means for the exiting of filtered air at the other side thereof, blow-out means mounted within the filter housing, means for connecting said blow-out means with a compressed air means, said blow-out means including a rotating tubular member having discharge aperture means for directing air substantially perpendicularly to the filtered air side of the filter about the surface thereof, and discharge nozzle means provided between the filter housing and the filter for directing air toward the unfiltered air side of the filter about the surface thereof.

* * * * *